(12) United States Patent
Tolbert, Jr.

(10) Patent No.: US 7,673,036 B1
(45) Date of Patent: Mar. 2, 2010

(54) METHOD AND SYSTEM FOR AUTOMATED HANDLING OF SERVICE PROBLEMS IDENTIFIED BY A WIRELESS DEVICE CUSTOMER

(75) Inventor: Robert E. Tolbert, Jr., Kennesaw, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1285 days.

(21) Appl. No.: 10/729,793

(22) Filed: Dec. 5, 2003

(51) Int. Cl.
*G06F 15/177* (2006.01)
*G06F 15/173* (2006.01)

(52) U.S. Cl. .................. 709/224; 709/220; 709/223

(58) Field of Classification Search .......... 709/203, 709/223, 224, 227, 246, 220
See application file for complete search history.

(56) References Cited

U.S. PATENT DOCUMENTS

| | | | |
|---|---|---|---|
| 6,317,570 B1 * | 11/2001 | Uchida et al. ................. 399/8 |
| 6,321,348 B1 * | 11/2001 | Kobata ........................ 714/37 |
| 6,347,339 B1 * | 2/2002 | Morris et al. ............... 709/237 |
| 6,587,646 B2 * | 7/2003 | Kikuchi et al. ................. 399/8 |
| 6,757,837 B1 * | 6/2004 | Platt et al. ...................... 714/4 |
| 6,857,013 B2 * | 2/2005 | Ramberg et al. ............ 709/223 |
| 7,080,141 B1 * | 7/2006 | Baekelmans et al. ........ 709/224 |
| 2003/0093406 A1 * | 5/2003 | Zellner et al. .................. 707/1 |
| 2003/0191830 A1 * | 10/2003 | Fitzgerald .................... 709/223 |

OTHER PUBLICATIONS

U.S. Appl. No. 09/783,929, Robert E. Tolbert, II.

* cited by examiner

*Primary Examiner*—Hussein Elchanti

(57) ABSTRACT

A method and system provides for automated handling of a service problem reported by a wireless device customer by first identifying the specific nature of the service problem by comparing certain system condition information to a database of known problems, and then initiating a corrective action responsive to the specific nature of the service problem. One such corrective action involves communicating certain computer instructions to one or more switches or other network components to adjust their settings.

20 Claims, 2 Drawing Sheets

METHOD AND SYSTEM FOR AUTOMATED HANDLING OF SERVICE PROBLEMS IDENTIFIED BY A WIRELESS DEVICE CUSTOMER

BACKGROUND OF THE INVENTION

1. Field of the Invention

The present invention relates to the field of telecommunications, and, more particularly, relates to a method and system for automated handling of service problems identified by a wireless device customer, such as an individual with a mobile telephone, a pager, or a personal data assistant with wireless connectivity.

2. Description of Related Art

Presently, when a wireless device customer experiences problems with service, the customer contacts a customer service representative ("CSR") via telephone, email, or in-person at a retail store. The CSR is trained to ask certain questions and follow a specific decision-tree logic to gather information and data in order to assess and address the problem. However, although the CSR may be able to identify the problem, a CSR typically does not have the training or ability to actually resolve the problem. Instead, once the problem has been identified, technical support personnel must be contacted to make necessary adjustments to network components. This is often a time-consuming process, as a CSR may have to make multiple calls to locate the appropriate technical support person to assist with the problem. Even then, there may be an additional delay as the technical support person may not be able to address the problem immediately. Unfortunately, such delays inconvenience and frustrate the customer.

Thus, there is a need for a method and system for automated handling of service problems identified by a wireless device customer, a method and system that would eliminate the need for human intervention and facilitate rapid network adjustments to remedy service problems.

SUMMARY OF THE INVENTION

The present invention is a method and system for automated handling of service problems identified by a wireless device customer, such as an individual with a mobile telephone, a pager, or a personal data assistant with wireless connectivity.

Specifically, the present invention uses a diagnostic analysis to identify the specific nature of the service problem, and then initiates automated resolution of that problem by accessing and making adjustments to one or more network components.

In one preferred embodiment for carrying out the method of the present invention, the first step involves the communication of certain information from a wireless device customer to a computer server through some sort of user interface device, the information including, for example, a telephone or pager number, user name, and/or similar identification information. The wireless device customer is then prompted to enter information about the system conditions, i.e., the conditions related to the service problem. As part of this inputting process, based on the information entered, additional information or data may be solicited from the user based on a decision-tree logic. Once the necessary information has been input, a comparison of that information is made to a database of known problems in order to identify the specific nature of the service problem.

In another preferred embodiment for carrying out the method of the present invention, the communication of the necessary identification information and the information about the system conditions is communicated to the computer server through an agent or customer service representative who the wireless device customer has contacted to assist with a service problem In any event, once the specific nature of the service problem has been identified, an appropriate corrective action is automatically initiated by the server. One corrective action involves the adjustment of switch settings. To make necessary adjustments to the switch settings, it is preferred that a telnet client session be automatically initiated by the server to connect to a switch. Through such a connection, the settings associated with the particular mobile station in issue can be checked and adjusted as necessary. This is preferably accomplished, without the intervention of a technician, through execution of a set of computer instructions (e.g., a UNIX script) communicated to the switch through the telnet client session or similar communication medium. In other words, the necessary sets of computer instructions can be characterized as preprogrammed fixes that are stored in a database and responsive to specific identified service problems.

Finally, it is also contemplated that corrective actions could be initiated to make adjustments to or otherwise resolve issues associated with network components other than switches without the intervention of a technician, but within the spirit and scope of the present invention. For example, such corrective actions may also include downloading of certain settings, software updates, or maintenance programs to the wireless device using an Over-the-Air (OTA) server; or the modification of certain customer-related information on Internet access servers.

BRIEF DESCRIPTION OF THE DRAWINGS

Preferred and alternative embodiments are described with reference to the attached figures wherein like reference numerals indicate similar or identical features or functions, and wherein.

DETAILED DESCRIPTION OF THE INVENTION

The present invention is a method and system for automated handling of service problems identified by a wireless device customer, thus allowing service problems to be rapidly addressed. Specifically, the present invention uses a diagnostic analysis to identify the specific nature of the service problem, and then initiates automated resolution of that problem by accessing and making adjustments to one or more network components.

As will become clearer in the description that follows, the various logical and operational steps of the method and system of the present invention are achieved through the use of a digital computer program. With benefit of the foregoing description, appropriate software coding is readily accomplished by one of ordinary skill in the art.

Figure 2:
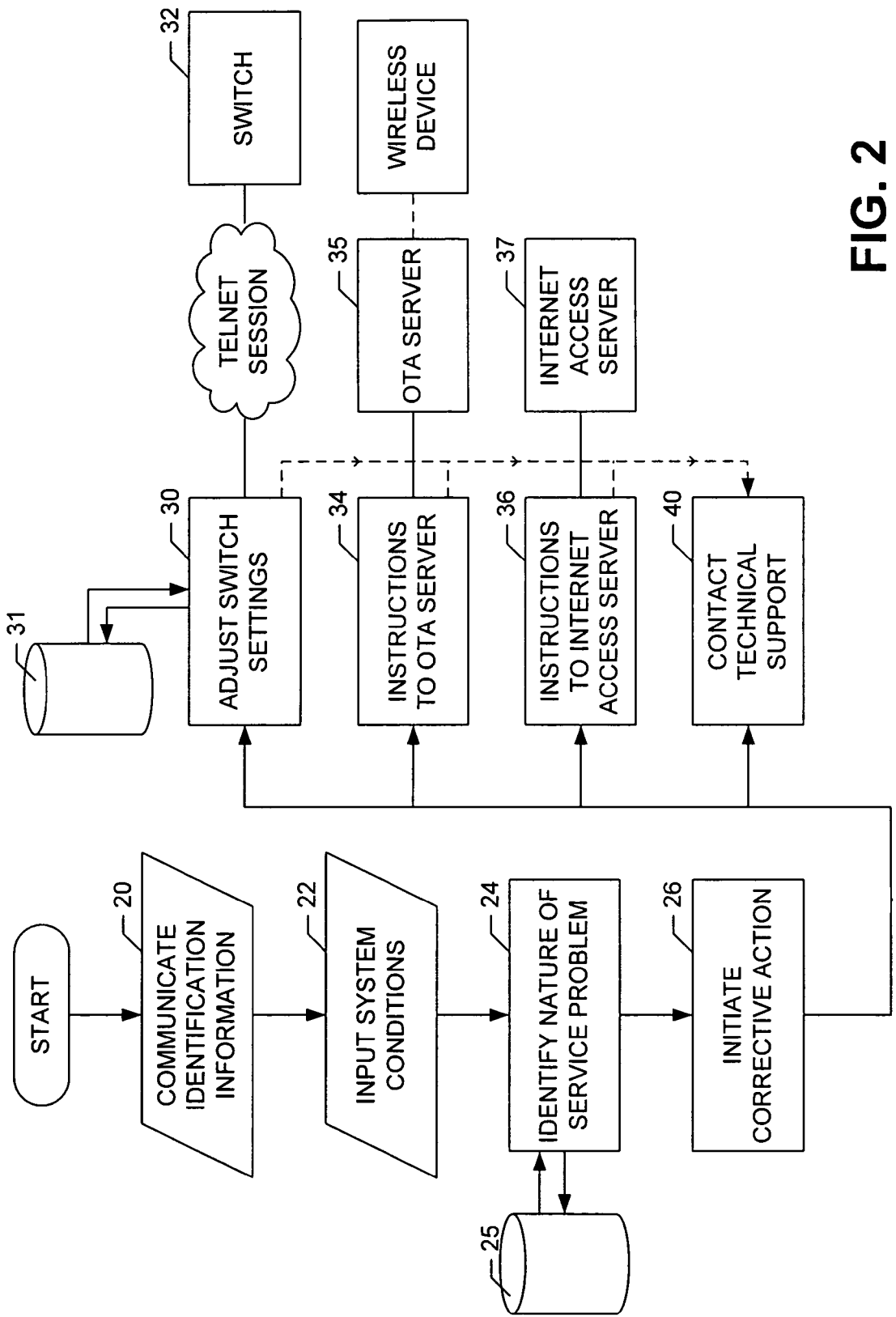
FIG. 2 is a flow chart illustrating the method steps involved in an exemplary implementation of the method and system of the present invention.

Referring first to the flow chart of FIG. 2, in this exemplary implementation of the method of the present invention, the first step involves the communication of certain information from a user, as indicated at blocks 20 and 22 of FIG. 2. For purposes of this description, the user may be the wireless device customer, or perhaps an agent or customer service representative who the wireless device customer has contacted to assist with a service problem. In any event, it is contemplated that the user first initiate communication with a computer server 10 through some sort of user interface device. In this regard, the server 10 hosts the digital computer program that carries out the necessary logical and operational steps. As for the user interface device, it can be any device that allows for the exchange of information between the user and the server 10.

Figure 1A:
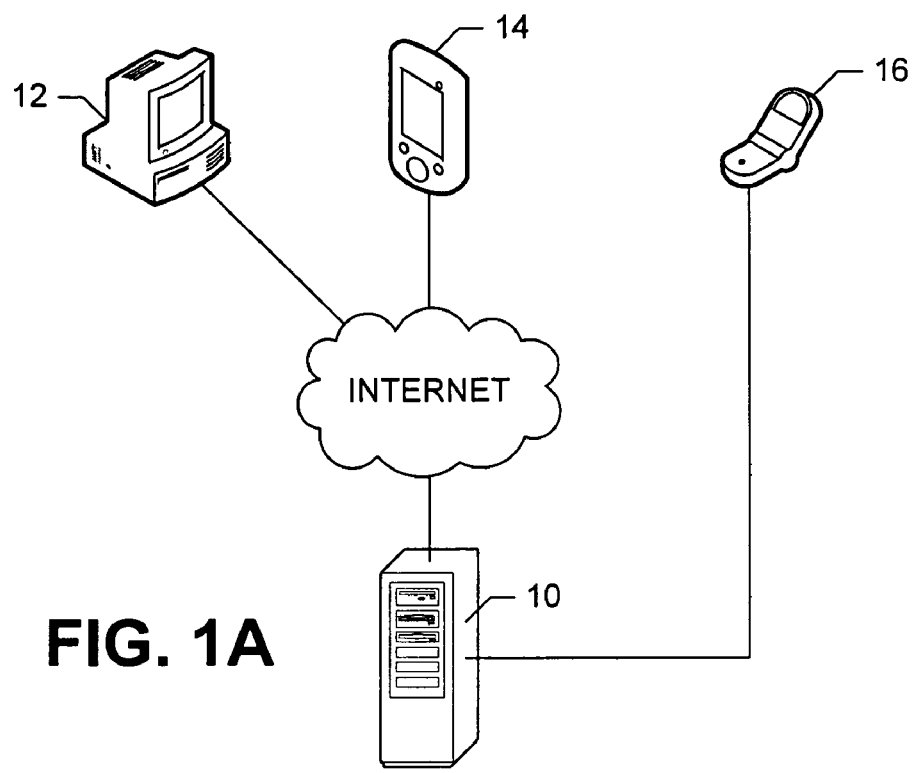
FIG. 1a is a schematic diagram illustrating how a wireless device customer may initiate communication with the computer server in accordance with the method and system of the present invention.

As illustrated in FIG. 1a, when the "user" is the wireless device customer, some examples of an appropriate interface device include: a personal computer 12 operably connected to the server 10 through the Internet or similar computer network; a personal digital assistant 14 again operably connected to the server 10 through the Internet; and/or a telephone 16 for communicating with the server 10 through touchtone or voice recognition techniques. Indeed, it is contemplated that a wide variety of telecommunication technologies could be used without departing from the spirit and scope of the present invention, including: cellular communications; wireless Short Message Service (SMS); Wireless Fidelity (WiFi), wireless local area networks operating under the 802.1x IEEE standards; and/or Mobitex, a packetized narrow-band data service.

Figure 1B:
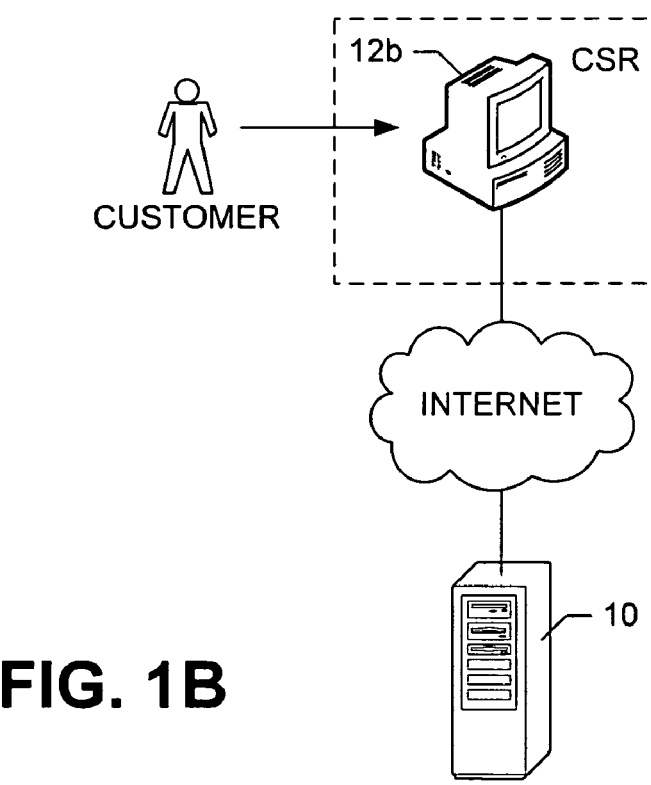
FIG. 1b a schematic diagram illustrating how communication with the computer server may be facilitated through an agent or customer service representative in accordance with the method and system of the present invention.

As illustrated in FIG. 1b, when the "user" is an agent or customer service representative who the wireless device customer has contacted serve as an intermediary and to assist with a service problem, a common interface device would be again be a personal computer 12b operably connected to the server 10 through the Internet or similar computer network. Of course, any of the technologies described above with reference to the customer could also be utilized by the agent or customer service representative to initiate communication with the server 10 without departing from the spirit and scope of the present invention.

Regardless of the specific interface device utilized, once communication has been established between the server 10 and the user, certain identification information is communicated to and received by the server, as indicated at block 20 of the flow chart of FIG. 2. This information may be automatically communicated to the server, for example, through called ID or similar technologies that allow for identification of a device or individual. Alternatively, the user may be prompted to input the telephone or pager number, user name, and/or similar identification information. Although not illustrated in FIG. 2, such identification information can be further used to query customer databases and accumulate additional information and data about the customer for subsequent analysis.

After the identification information is received and stored, the user is prompted to enter information about the system conditions, i.e., the conditions related to the service problem, as indicated at block 22. As part of this inputting process, based on the information entered, additional information or data may be solicited from the user based on a decision-tree logic. For example, if the user reports that mobile telephone calls are not being received, a second set of questions might be presented in order to narrow down and identify what specifically is causing calls not to be received. In any event, once the necessary information has been input, a comparison of that information is made to a database 25 of known problems in order to identify the specific nature of the service problem, as indicated at block 24. In other words, the server 10 employs a diagnostic logic to identify the specific nature of the service problem.

In the method and system of the present invention, once the specific nature of the service problem has been identified, an appropriate corrective action is automatically initiated, as indicated at block 26. In this regard, it should be recognized that the term "corrective action" should be broadly interpreted to not only include actions in response to "errors," but also includes routine maintenance items, as is further described below.

One corrective action involves the adjustment of switch settings. In this regard, it is important to recognize that each wireless device in a network is commonly referred to a mobile station. With respect to the use of a mobile telephone, when a call is initiated, an initiation request is transmitted from the mobile station to the nearest base station. The base station then communicates the request to a mobile switching center. The mobile switching center is the nucleus of the network, connecting to the land-based, public switched telephone network. As such, the mobile switching station is responsible for validating and authenticating calls initiated from each mobile station, and then setting up and maintaining those calls. Such a network architecture is well known to one of ordinary skill in the art. Since the mobile switching center is so critical to operation of the telecommunications network, whether for a mobile telephone, a pager, or a personal data assistant with wireless connectivity, switch settings are often to blame for customer service problems.

Referring again to FIG. 2, once the specific nature of the service problem has been identified, one corrective action is adjustment of the switch settings, as indicated at block 30. Preferably, a telnet client session is automatically initiated by the server 10 to connect to the switch 32, which could be either the customer's home switch or a serving switch. Through such a connection, the settings associated with the particular mobile station in issue can be checked and adjusted as necessary. For example, if the customer has failed to pay a bill, the settings may indicate that the mobile station has been intentionally disabled and that information can be communicated back to the user. However, in many cases, minor adjustments to the switch settings may resolve the customer complaint.

With respect to the use of a telnet client session, it should be recognized that such a communication technique is commonly used by network engineers and is well-recognized by those of ordinary skill in the art. Nevertheless, instructions could also be communicated to the switch through other known technologies without departing from the spirit and scope of the present invention, including, but not limited to, File Transfer Protocol (FTP), Secure FTP, HyperText Transfer Protocol (HTTP), HyperText Transfer Protocol Secure (HTTPS), Simple Object Access Protocol (SOAP), and Java Messaging Services (JMS).

For example, if a user reports (through the input routine described above) that a particular mobile telephone rings once and then goes straight into voicemail, adjustments can be made at the switch 32 to increase the setting that governs the ring time before routing a call into voicemail. This is preferably accomplished, without the intervention of a technician, through execution of a set of computer instructions (e.g., a UNIX script) communicated to the switch 32 through the telnet client session or similar communication medium. Thus, the necessary sets of computer instructions are essentially preprogrammed fixes that are stored in a database 31 and responsive to specific identified service problems.

For another example, if a user reports that a particular mobile telephone does not ring when someone calls the mobile number, an adjustment can be made at the switch 32 to increase the setting that governs the number of pages. Again, this is preferably accomplished, without the intervention of a technician, through execution of a set of computer instructions stored in database 31 and communicated to the switch 32.

For yet another example, if a user reports that there is a busy recording on outbound calls from a mobile telephone, the electronic serial number can be verified and appropriate adjustment made if there is a mismatch at the switch 32.

For yet another example, and returning to the circumstances in which the customer has failed to pay a bill, the server 10 may be operably connected to the billing system (not shown) such that, upon notification to the user that the mobile station has been intentionally disabled, the user may have the option of paying the bill by credit card or similar means. Upon confirmation of payment, the server 10 would effectuate the appropriate adjustments at the switch 32 to re-activate service.

Of course, the above are only examples of the types of switch setting adjustments that could be carried out in accordance with the teachings of the present invention.

Referring still to FIG. 2, another corrective action might involve the downloading of certain settings, software updates, or maintenance programs to the wireless device using an Over-the-Air (OTA) server. With reference to FIG. 2, once the specific nature of the service problem has been identified and related to certain setting or software on wireless device, the server 10 communicates appropriate instructions to the OTA server 35, as indicated at block 34, resulting in the downloading of the appropriate settings, software updates, or maintenance programs to the wireless device.

For example, if a user wanted to switch from a pre-pay option to a monthly billing option for his wireless device, certain software downloads would be required to effectuate the billing change. Using the OTA server, such downloads could be effectuated without the assistance of technical personnel.

For another example, it may be necessary for a user to update the Intelligent Roaming Database (IRDB), the list of acceptable networks in which a wireless device can roam and operate, which is stored in the memory of the wireless device. Again, using the OTA server, such an update could be effectuated without the assistance of technical personnel. Such an update might be especially important for a customer transferring to a new carrier pursuant to governmental Wireless Local Number Portability (WLNP) regulations.

Referring still to FIG. 2, yet another corrective action resolution might involve the modification of certain customer-related information on Internet access servers. Specifically, such Internet access servers handle tasks such as authenticating Internet connections and controlling and monitoring user connection to the Internet. Therefore, once the specific nature of the service problem has been identified as relating to the Internet access servers, the server 10 can communicate appropriate instructions to the Internet access server 37, as indicated at block 36, to modify the pertinent settings.

Again, the above are only examples of the types of corrective actions, including routine maintenance functions, that could be carried out in accordance with the teachings of the present invention. It is contemplated that corrective actions could also be initiated to make adjustments to or otherwise resolve issues associated with various other network components without the intervention of a technician without departing from the spirit and scope of the present invention.

Finally, it is recognized that in some circumstances, if no appropriate corrective action can be identified based on the inputted system conditions, it may be necessary to transmit a message to appropriate technical personnel for resolution, as indicated at block 40 of FIG. 2. It is contemplated that such a message would contain a detailed description of the service problem, including all solicited customer data and information used to assess the service problem. Similarly, if there was a failure in the adjustment of the switch settings (at block 20); failure in the downloading of appropriate settings, software updates, or maintenance programs to the wireless device (at block 34); or failure in the modification of Internet access server settings (at block 36), a message could also be transmitted to the appropriate technical personnel for resolution, as indicated at block 40 of FIG. 2.

Although not illustrated in the flow chart of FIG. 2, as service problems are addressed and identified in accordance with the method and system of the present invention, it is contemplated that service problems could be stored for trend analysis and/or to identify network equipment problems.

Again, it is important to recognize that the various logical and operational steps of the method and system of the present invention are achieved through the use of a digital computer program. Such a computer program (or similar computer-readable instructions) is preferably installed and stored on the server 10. With benefit of the foregoing description, appropriate software coding is readily accomplished by one of ordinary skill in the art.

Thus, the method and system of the present invention provides for automated handling of service problems identified by a wireless device customer such that service problems can be rapidly addressed.

It will be obvious to those skilled in the art that further modifications may be made to the embodiments described herein without departing from the spirit and scope of the present invention.

What is claimed is:

1. A method for automated handling of a service problem discovered and reported by a user of a wireless telecommunications device, comprising:
    receiving identification information identifying the wireless telecommunications device;
    receiving information about system conditions associated with a problem relating to a service provided to the wireless telecommunications device, directly from the user of the wireless telecommunications device;
    requesting additional information about system conditions via a user interface based in part on decision tree logic to facilitate identification of a specific nature of the service problem;
    receiving the additional information via the user interface;
    identifying a specific nature of the service problem based in part on an analysis of system condition data obtained from of the received information and the received additional information, the analysis includes comparison of the system condition information to a database of known problems; and
    automatically effecting a corrective action responsive to the specific nature of the service problem without human intervention, wherein the corrective action includes adjustment of settings of one or more network components that facilitate providing the service to the wireless telecommunications device, through execution of computer instructions that are communicated to the one or more network components.

2. The method as recited in claim 1, further comprising the step of prompting the user of the wireless telecommunications device to input the identification information.

3. The method as recited in claim 1, wherein the wireless telecommunications device is a mobile telephone.

4. The method as recited in claim 1, wherein the one or more network components comprise a switch and wherein the corrective action includes adjusting the settings of the switch.

5. The method as recited in claim 4, further comprising, automatically initiating a telnet session to connect to a switch and adjust one or more setting associated with the wireless telecommunications device through the connection.

6. The method as recited in claim 1, wherein the corrective action includes downloading settings or software updates to the wireless telecommunications device.

7. The method as recited in claim 1, wherein the wireless telecommunications device and the computer server communicate through a computer network.

8. The method as recited in claim 7, wherein the computer network is the Internet.

9. The method as recited in claim 1, further comprising the step of automatically determining identification information associated with at least one of the user or the wireless telecommunications device.

10. The method as recited in claim 1, wherein the computer instructions are preprogrammed fixes that are stored in a database and are responsive to the service problem.

11. The method as recited in claim 1, wherein the corrective action includes employing an Over-the Air (OTA) server to at least one of download settings, software updates or maintenance programs to the wireless telecommunications device.

12. The method as recited in claim 1, wherein the corrective action includes modification of customer-related information on an internet access server.

13. The method as recited in claim 4, wherein the switch is at least one of the user's home switch or a serving switch associated with the wireless telecommunications device.

14. The method as recited in claim 1, further comprising, providing the user information associated with the settings of the one or more network components when identified that the system conditions are intentionally set.

15. The method as recited in claim 1, further comprising, connecting the user to a billing system when the specific nature of the service problem is identified as failure to pay a bill.

16. The method as recited in claim 1, wherein the corrective action includes employing an Over-the Air (OTA) server to at least one of effectuate a billing change or update an intelligent roaming database (IRDB), associated with the wireless telecommunications device.

17. A method that facilitates automated handling of a service problem upon the identification of a service problem by a user, comprising:
  receiving identification information identifying a wireless telecommunications device;
  receiving information about system conditions, associated with a problem relating to a service provided to the wireless telecommunications device, directly from the user of the wireless telecommunications device;
  prompting a user to input additional information about the problem associated with the service via a user interface based in part on decision tree logic to facilitate identification of a specific nature of the service problem;
  receiving the additional information in response to the prompt via the user interface;
  identifying the nature of the service problem based in part on an analysis of system condition data obtained from the received information and the received additional information, the analysis includes comparison of the information about the service problem to a database of known problems; and
  automatically effecting a corrective action responsive to the nature of the service problem without human intervention, wherein the corrective action includes adjustment of settings of one or more network components that facilitate providing the service to the wireless telecommunications device, through execution of computer instructions that are communicated to the one or more network components.

18. The method as recited in claim 17, wherein the wireless telecommunications device is a mobile telephone.

19. The method as recited in claim 17, wherein the act of automatically effecting a corrective action includes communicating instructions to one or more network components to adjust settings associated with said one or more network components.

20. The method as in claim 19, wherein said network components are switches.

* * * * *